(12) United States Patent
Kind et al.

(10) Patent No.: US 12,354,116 B2
(45) Date of Patent: Jul. 8, 2025

(54) ECOSYSTEM AND METHOD FOR EXCHANGING INFORMATION ABOUT ESG DATA OF A PRODUCT RELATED ENTITY

(71) Applicant: Siemens Aktiengesellschaft, Munich (DE)

(72) Inventors: Andreas Kind, CH-Zürich (DE); Maximilian Weinhold, Munich (DE); Florian Sebastian Albrecht, Munich (DE); Martin Dietz, Amberg (DE); Gunter Beitinger, Amberg OT Eglsee (DE); Thomas Holzner, Berlin (DE); Ionut Alexandru Leonte, Bucharest (RO); Florian Ansgar Jaeger, Berlin (DE); Jonas Hohlweck, Munich (DE)

(73) Assignee: Siemens Aktiengesellschaft, Munich (DE)

(*) Notice: Subject to any disclaimer, the term of this patent is extended or adjusted under 35 U.S.C. 154(b) by 172 days.

(21) Appl. No.: 17/685,919

(22) Filed: Mar. 3, 2022

(65) Prior Publication Data

US 2022/0284446 A1    Sep. 8, 2022

(30) Foreign Application Priority Data

Mar. 5, 2021 (EP) .................. 21161018

(51) Int. Cl.
*G06Q 30/018* (2023.01)
*G06Q 10/10* (2023.01)
(Continued)

(52) U.S. Cl.
CPC ......... *G06Q 30/018* (2013.01); *H04L 9/3218* (2013.01); *H04L 9/3255* (2013.01); *H04L 9/3263* (2013.01)

(58) Field of Classification Search
CPC ............ G06Q 30/018; G06Q 10/0631; G06Q 10/06395; H04L 9/3218; H04L 9/3255;
(Continued)

(56) References Cited

U.S. PATENT DOCUMENTS

2012/0060028 A1    3/2012  Furukawa
2019/0173854 A1*   6/2019  Beck ................. H04L 67/10
(Continued)

FOREIGN PATENT DOCUMENTS

EP          2437427 A1 *  4/2012  ........... H04L 9/3218
WO      WO 2010/137508     12/2010
WO      WO 2020/229947     11/2020

OTHER PUBLICATIONS

"Blockchain news: QEDIT launches asset transfer enterprise solution for preserving data privacy on blockchain." (May 14, 2019). Investorideas.Com Newswire Retrieved from https://dialog.proquest.com/professional/docview/2224433427?accountid=131444 (Year: 2019).*

(Continued)

*Primary Examiner* — Jonathan P Ouellette
(74) *Attorney, Agent, or Firm* — Cozen O'Connor

(57) ABSTRACT

A method and system includes subject participants, a verifier participant and a certifier participant of a communication network exchanging information about ESG data, wherein a subject participant provides a proof derived from an ESG credential and the verifier participant receives the proof via the communication network, where the participant receives the ESG credential from the certifier participant, the proof assigns authenticity of the certifier participant providing the ESG credential, wherein the proof additionally assigns integrity of the ESG data, parts or an attribute of the ESG data, wherein the system further includes nodes of a decentralized registry that manages a public key of the certifier participant, where the decentralized registry provides a
(Continued)

public key of the certifier participant corresponding to the proof to the verifier participant so that the verifier participant can cryptographically verify the authenticity and integrity with the public key via a computing component of the verifier participant.

19 Claims, 5 Drawing Sheets

(51) Int. Cl.
  *G06Q 30/02* (2023.01)
  *G06Q 30/06* (2023.01)
  *H04L 9/32* (2006.01)
(58) Field of Classification Search
  CPC . H04L 9/3263; H04L 2209/80; H04L 9/0825; H04L 9/32; G06F 21/57; G06F 21/64; G06F 21/44; G06F 21/45; G06F 21/602
  USPC .................................................. 705/1.1–912
  See application file for complete search history.

(56) References Cited

U.S. PATENT DOCUMENTS

| | | | |
|---|---|---|---|
| 2019/0312734 | A1 | 10/2019 | Wentz et al. |
| 2020/0153627 | A1 | 5/2020 | Wentz |
| 2020/0211099 | A1 | 7/2020 | Smith et al. |
| 2021/0004739 | A1* | 1/2021 | Gill ........................ G06Q 50/28 |
| 2022/0051261 | A1* | 2/2022 | Vetas ................... G06Q 30/018 |
| 2022/0094542 | A1 | 3/2022 | Wright et al. |
| 2022/0377084 | A1* | 11/2022 | Zhang ................... H04L 9/3247 |
| 2023/0069078 | A1* | 3/2023 | Pennington ........ G06Q 20/3823 |
| 2023/0394495 | A1* | 12/2023 | Abdelsamie ......... G06Q 30/018 |

OTHER PUBLICATIONS

"Deloitte blockchain platform eduscrypt uses QEDITs privacy-enhancing technology." (Oct. 30, 2019). ICT Monitor Worldwide Retrieved from https://dialog.proquest.com/professional/docview/2310287452?accountid=131444 (Year: 2019).*
EP Search Report dated Aug. 3, 2021 based on EP 21161018.3 filed Mar. 5, 2021.

* cited by examiner

ECOSYSTEM AND METHOD FOR EXCHANGING INFORMATION ABOUT ESG DATA OF A PRODUCT RELATED ENTITY

BACKGROUND OF THE INVENTION

1. Field of the Invention

The invention relates to a method and system comprising subject participants, at least one verifier participant and at least one certifier participant of a communication network exchanging information about environmental, social and corporate governance (ESG) data of a product related entity.

2. Description of the Related Art

As the financial performance of companies is increasingly linked to corporate sustainability and societal impact, many companies declare environmental, social and corporate governance (ESG) targets and include such criteria in compensation schemes of their managing boards. In addition, environmental externalities of industrial activities are increasingly monetarized in several markets with taxes or cap and trade systems. One important ESG target is decarbonization, which refers to reducing emission of greenhouse gases (GHG), reported as CO2 equivalent, short CO2e, on a company, production and product level. The global economy will have to be decarbonized to protect societies and economies against serious impact from climate change. The need for reducing GHG emissions has led globally to laws and regulations on carbon taxation and emission trading schemes. Both schemes aim to shift the burden of carbon emission related damage back to those who are responsible for it, and who can reduce or compensate for it.

In response to the need for transparency of environmental impacts, accounting standards such as the ISO 14040 series (Product Life Cycle LCA) and ISO/TS 14072 (Organizational LCA) have been developed and specific carbon accounting standards for companies, production sites (organizations) and products and services have been developed: Greenhouse Gas (GHG) Protocol, PAS 2050 and ISO 14067. This helps a party to reliably account for its own operations.

Life cycle assessment (LCA) databases are used for ESG information calculation and compilation. For instance, LCA databases are used to lookup product carbon footprint (PCF) values for a generic type of part and assumes the actual information about a product to be equal to the generic information in the database. Such database systems are sold by Sphera or Ecoinvent.

The assumption-based approach ignores the supplier specific variations in production and logistics of a given batch of products and, thus, leads to errors in shared ESG data.

SUMMARY OF THE INVENTION

Considering the described drawbacks in the state-of-the-art, it is therefore an objective of the present invention to provide a method and a system for reliably and certifiably sharing environmental, social and corporate governance (ESG) information between participants in an ecosystem while protecting confidentiality and privacy of the participants.

These and other objectives and advantage are achieved in accordance with the invention by a system comprising subject participants, at least one verifier participant and at least one certifier participant of a communication network exchanging information about ESG data of a product related entity, where at least one of the subject participants is configured to provide at least one proof derived from an ESG credential via the communication network and at least one of the verifier participants is configured to receive the at least one proof via the communication network, where the at least one subject participant is configured to receive the ESG credential from the at least one certifier participant.

In accordance with the invention, the proof is configured to assign an authenticity of the at least one certifier participant providing the ESG credential, where the proof is further configured to assign an integrity of the ESG data or parts of the ESG data or an attribute of the ESG data.

The system additionally comprises nodes of a decentralized registry, where the decentralized registry is configured to manage at least one public key of the at least one certifier participant, and where the decentralized registry provides a public key of the at least one certifier participant corresponding to the proof to the at least one verifier participant so that the at least one verifier participant can cryptographically verify the authenticity and integrity with the public key via a computing component of the verifier participant.

The system, for example, comprises a plurality of subject participants and a plurality of verifier participants and a plurality of certifier participants. The system preferably is flexibly extensible and additional subject, verifier or certifier participants might be added over time to the communication network. As a communication channel within the system, any suitable channel based on, e.g., any suitable internet protocol, is used. The system is, for example, an ecosystem or a network of organizations, that interact for the manufacturing or delivery of a specific product or service.

The participants, and in particular verifier and subject participants, share information about ESG data of a product related entity. The product related entity is, for example, a subject participant, who is a supplier or manufacturer or utility provider or logistics provider in a supply chain of the respective product. A product can also be a service. A product related entity further is, for example, an artifact, such as a company or a production site or a product or a service or a part or component of a product or of a service or any artifact related to a product offering or involved in a product development process.

If a supplier, for example, solely produces and delivers one product component under constant conditions, then the supplier as subject participant can be seen as product related entity. If a supplier, for example, produces under different conditions, e.g., in different productions sites, then each of the production sites of the same supplier can be seen as a different product related entity.

The product related entity, for example, is defined in an ESG credential definition that is generated by the certifier participant. This credential definition is dependent on the attributes, that will be certified by the certifier participant. If the product related entity is, for example, a manufacturers production site, then ESG data or part of the ESG data that is in the responsibility of the manufacturer for this production site is to be certified. The credential definition will describe all the metadata about that data, i.e., defines the schema of the future issued credential. The credential definition is created by the certifier participant, for example, based on a request for credential by the subject participant, where the subject participant defines the data or attributes to be certified.

The ESG information relates to environmental, social, and/or corporate governance information. That is, the ESG information relates, for example, to greenhouse gas emission values, a carbon footprint index or working condition or material origin indicators.

A decentralized registry is used to manage at least the public key of the at least one certifier participant. For example, for each certifier participant, a corresponding public key is stored in the decentralized registry. The decentralized registry, for example, is a distributed database, such as a database on the basis of distributed ledger technology, in particular a blockchain database. The decentralized registry is a trusted registry in the system. The main function of the decentralized registry is to store and provide public keys of the certifier participants in a trustworthy manner. The decentralized register is preferably accessible by the ecosystem participants only. The decentralized registry manages the public keys for example by assigning respective public addresses or pseudonyms or identifiers to the respective public keys and storing this assignment.

The participants are, for example, represented by public addresses and a communication among the participants in the communication network is realized using the public addresses. The communication is realized, for example, by protocols that use the public addresses. For processing messages within the communication network, the participants preferably comprise computing components or processing units. For example, the computing component may comprise a central processing unit (CPU) and a memory operatively connected to the CPU.

The decentralized registry, for example, moreover stores the credential definitions that are registered by the certifier participants. The certifier participants define the schema for ESG credentials they issue for subject participants, so that the verifier can use the ESG credential definition accessible via the nodes of the decentralized database to process the certified data.

For example, the communication network of the participants is used to interact with the nodes. In this way, a system is built comprising the participants, wherein preferably all of the participants comprise a respective computing component, and the nodes. The at least one certifier participants or all certifier participants interact with at least one node or comprise a node. Moreover, the at least one verifier component or all verifier components interact with at least one node or comprise a node. A subject participant for example also interacts with at least one node or comprises a node, in particular in embodiments, where a subject participant partly or fully is formed as subject and certifier participant at the same time.

The nodes in the decentralized registry network may be servers or terminal devices that have the function of processing registry data. For example, each node in a blockchain network performs functions such as validating transaction data, appending transaction data into a current block, committing a block, linking a new block to an existing block.

For example, a manufacturer as subject participant provides a proof to a customer of a manufactured product as verifier participant. The customer verifies the proof to obtain trustworthy information about the ESG data. The customer therefore preferably extracts from the proof information about a certifier participant. The customer derives that the proof is based on an ESG credential issued by a specific certifier participant and requests the public key of this certifier participant in the decentralized registry. With the public key, the proof can be verified, so that the customer obtains a trustworthy statement concerning ESG data of the product offered by the manufacturer. This includes a trustworthy statement about the authenticity of the certificate issuer, i.e., the certifier participant, as well as about an integrity of the ESG data or a part of the ESG data or an attribute of the ESG data. Therefore, the customer receives trustworthy information about ESG data of the product of the manufacturer.

Information about indirect environmental or social impacts of a subject participant are therefore advantageously not based on vague assumptions but are certified by a trusted party of the ecosystem and are verifiable by the verifier participant in a trustworthy manner.

In the proposed system, preferably pseudonyms or public addresses are used for interaction of different participants of the ecosystem.

The decentralized registry preferably only maps pseudonyms or public addresses of subject participants with the corresponding public keys of subject participants. A certifier participant, for example, either registers its own public key with a mapping to its real identity as certifier or also uses a pseudonym. In embodiments, where a subject participant also acts as certifier participant and itself creates an ESG credential, the public key in the decentralized register is preferably mapped to a pseudonym.

The ESG credential, for example, comprises certified and verifiable information about at least the ESG data of the subject participant. The ESG credential either certifies in particular all ESG data provided by the subject participant or parts of the ESG data or attributes of the ESG data. In embodiments with further subject participants, the ESG credential moreover comprises certified and verifiable information about ESG data of the further subject participant. Again, in particular, all ESG data provided by the subject participant or parts of the ESG data or attributes of the ESG data is certified. The subject participant, as holder of the ESG credential, decides what to include in the proof he sends to the verifier.

The ESG credential in certain embodiments is further signed by the subject participant providing the proof. In addition to the public key of the certifier, also the public key of the subject participant is therefore requested by the verifier participant and looked up, for example, in the decentralized registry or is provided through other communication channels.

Preferably, the subject participant uses a public address, or a pseudonym only and, moreover, only uses the pseudonym for the communication with that specific verifier participant in the signature mechanism to allow confidentiality for future verification processes. If, for example, a further participant in the supply chain, e.g., a different customer or a different buyer of a further tier will verify the proof in the future, then from the proof and the signature mechanism used, there is no information extractable about the identity of the subject participant and due to renewal of the pseudonym for every proof, there is moreover no trace extractable about subject-verifier- or subject-certifier-relations.

The proposed system enables an accounting approach for ESG information, where all participants as stakeholders in a supply chain assess at least their own ESG relevant data and share this information in a trustworthy, certifiable, though anonymous way if unlinkable pseudonyms are used, applicable to inclusively, but not exclusively all accounting standards mentioned above.

The certified ESG information might be used for shareholder, regulatory, or NGO reporting or for audits, tax declaration, sourcing simulation or supply chain engineering to gain higher resiliency or lower total product or service cost.

In accordance with an embodiment, the at least one certifier participant is additionally configured as a further verifier participant of a further subject participant. Within supply chains of products, for example, a plurality of subject participants such as manufacturers, suppliers of different tiers or utility providers, want to provide respective proofs of their own ESG data, for example, the contribution to the PCF of their product components to the next tier or to an end customer or to a regulatory instance or a non-governmental organization, NGO.

In an advantageous manner, a subject participant, who wants to provide a proof derived from an ESG credential, in the first place provides ESG information relating to its own ESG impact, for example, its own PCF impact or data about material used in the production process or an own production facility or location or present employment conditions etc. Moreover, information about ESG data from other subject participants in the supply chain are preferably included in the proof.

Advantageously, there is no estimation necessary about ESG data of further subject participants, e.g., via life cycle assessment databases or PCF values from generalized databases, so called secondary data. Instead, ESG information from further subject participants, in particular all subject participants in a supply chain or life cycle, potentially including use phase and end of life of a product, is considered for an ESG credential provided by the certifier participant.

Therefore, the certifier participant not only issues an ESG credential with the content of the ESG data from the actual subject participant requesting the ESG credential, but also includes further ESG data that is relevant for the overall ESG information of the product or service offered by the actual subject participant. This is the case whenever there are sourced products, materials, part or components of products, services, which are not produced or delivered or offered by the actual subject participant but sourced by other ecosystem participants.

The certifier being the further verifier at the same time requests or receives a further proof provided by a further subject participant. The further subject participant himself received an ESG credential by the same certifier or a further certifier.

For deriving the relevant ESG information or relevant subjects and their ESG data, the actual subject participant, for example, together with requesting the ESG credential transmits data concerning the bill of material (BOM) or bill of process (BOP) to the certifier participant. Based on this data, the certifier participant, for example, requests further proofs derived from further ESG credentials from the further subject participants involved according to the BOM or BOP data. Alternatively, the certifier participant possesses those further ESG credentials of further subject participants already, for example, because he/she was the certifier participant for the further subject participants as well.

By combining the further ESG credentials or further proofs derived from a further ESG credential of further subject participants with the ESG credential of the actual subject participant, a recursive ESG credential is generated. The recursive ESG credential has, for example, a section for local ESG information as well as one for external ESG information. Entries in the external section contain, for example, information about how to calculate or weight or normalize input of the further proof or how to include a pointer to the further proof. A pointer to an external proof is implemented, for example, by a combination of a pseudonym, e.g., a public address or public identifier, and preferably additional an internet service endpoint, e.g. a URL or IP address.

Based on the recursive ESG credential issued by the certifier participant, the subject participant derives a recursive proof from the recursive ESG credential. When the verifier verifies the recursive proof, again the public key of the certifier participant is used.

The recursive ESG credential has been issued by a trustful party of the ecosystem. Accordingly, the verifier can rely on the proof derived from the ESG credential, which comprises the linkage to the certifier. Furthermore, the verifier participant has the option to verify not only the authenticity and integrity of the proof generated by the actual subject participant, but also a further proof that has been generated by a further subject participant in the supply chain. Therefore, the verifier participant can use the information in the recursive proof, more specific the external section of the ESG credential comprised in the proof, and can use the pseudonyms and service endpoints provided to directly request the further proof derived from a further ESG credential from the further subject participant, e.g., a supplier delivering components to the manufacturer. The verification is performed again by using the public key of the certifier participant who issued the further ESG credential for the further subject participant. In case a further certifier issued the further proof, the public key of the further certifier is also derivable from the registry.

Alternatively, the verifier can rely on the certifier participant who issued the recursive ESG credential for the actual subject participant and in this process verified himself the authenticity and integrity of the further proof provided by the further subject participant. Then, for example, information comprised in the recursive credential issued by the certifier participant regarding the external section can be used by the verifier participant to process or interpret the ESG data or parts of ESG data provided, without tracing the entire chain of proof.

The recursive ESG information, for example, includes PCF or CO2 or CO2-e related values. Here, the local information has metadata information such as the carbon emission standard(s) being used, the method of data entry (manual, automatic), date or calculation, geo location, or company personnel.

In a related embodiment, local information includes actual Scope 1 and Scope 2 values measured in Kg CO2e according to the GHG Protocol. Scope 1 includes direct GHG emissions from sources that are owned or controlled by the producing company, for example the actual subject participant. Scope 2 accounts for GHG emissions from the generation of electricity purchased by the subject participant. This information is also provided by the actual subject participant.

Finally, Scope 3 include any other indirect GHG emissions. The sum of Scope 1, Scope 2 and upstream Scope 3 is referred to as product carbon footprint or PCF of the production phase of a product. For example, the external information refers to Scope 3 contributions to the overall PCF value as they consider impact of recycling, material used, pre-manufacturing, and/or logistics from the supply chain. The external section of the recursive ESG credential comprises pointers to other proofs providing information about PCF- or CO2- or CO2-e-values and information how to calculate the total PCF based on those other proofs, such as the number of units define in a bill-of-material. Other embodiments include data related to further PCF standards, such as PAS 2050 and ISO 14067.

The pointers to further ESG credentials or further proofs derived from further ESG credentials preferably only refer to unlinkable pseudonyms. This is particularly realized by using new or fresh pseudonyms for any messages in the communication network. Preferably, no inference of the true identity is possible. For example, an external section of the recursive ESG credential of a manufacturer refers to a further ESG credential, which has been issued for a supplier. There is no need for the verifier of the proof derived from the recursive ESG credential to learn about the real identities of the supplier, as long as the supplier's contribution to the ESG credential is trustworthy. Therefore, also the further proof derived from the further ESG credential provided by the further subject participant is verifiable via a public key of a certifier participant, which might be the same certifier participant as the one who issued the recursive credential or might be a further certifier participant.

For generating the proof, the recursive ESG credential in embodiments is signed by the subject participant providing the proof. In embodiments, the ESG credential is extractable from the proof and the authenticity of the certifier and integrity of the ESG credential is verifiable with the public key of the certifier and in addition, the authenticity of the subject participant providing the proof is verifiable.

In an advantageous manner, in the disclosed embodiments of the system with a chain of proofs derived from ESG credentials and recursive ESG credentials, traded emissions are not "double counted" unintentionally, meaning counted once by the supplier of origin when reporting its emissions inventory, and again by the receiving buyer or the actual subject participant. Double paying of taxes by actors in the supply chain on the same emissions is therefore prevented. Moreover, an erroneous transfer of emissions by a supplier to a recipient to reduce its own emissions to meet its pledged effort and a subsequent claiming of those same reductions by the recipient to meet again its pledged effort is also prevented. In that case and with conventional methods, only one reduction has actually occurred, but it could have been claimed twice.

According to the established standards, any type of carbon offset should be reported separately from the PCF. Even if accounted separately, for carbon offsetting applications with the proposed ecosystem, double selling of the very same offset is advantageously impeded.

In accordance with another embodiment, at least one of the subject participants is formed as the at least one certifier participant or a further certifier participant. This is advantageously the case if root-of-trust technology, such as trusted execution environments, secure memory or similar, is installed on subject participant side. With such technology, a tamper-resistant or tamper-proof evidence is provided about, for example, process steps, material consumption, product identity, machine identities or emissions. Further, a subject participant can be formed as certifier, e.g., if the subject participant is regularly certified by a trusted instance of the ecosystem. For example, a certification of a manufacturer, a manufacturer site or a manufacturer process is cryptographically verifiable, so that the signature of the manufacturer is trustworthy.

In those embodiments and if recursive ESG credentials are used, the subject participant as certifier participant also is a further verifier participant of a further subject participant. The subject participant then verifies a proof received from further participants, e.g. its suppliers, and then issues the recursive ESG credential for its own ESG information and the external ESG information.

In accordance with another embodiment, the at least one certifier participant is configured to have read and write access to the decentralized registry via the nodes, where the at least one verifier participant is configured to have at least read access via the nodes.

For registering the public address or pseudonym by the certifier participant, who might be a subject participant at the same time, it is necessary to write data into the decentralized registry. For example, transactions with the information about the public address/pseudonym and the corresponding public key, are sent into the distributed database. For instance, transactions are sent into the blockchain database and will be verified by the network community with an agreed consensus mechanism. For a successful registration of public keys, the participant has to identify himself with the proper keys. Once an address on the blockchain is created the public key will be made visible. The address itself is the "pseudonymization" of the participants.

For a verifier participant, only read access is necessary to receive the public keys of interest. Nevertheless, write access might be advantageous in cases, where the verifier participant will also act as a future certifier participant.

It is also an object of the invention to provide a computer-implemented method for providing at least one cryptographical proof derived from an ESG credential by at least one subject participant of a communication network exchanging information about ESG data of a product related entity, the network comprising several subject participants, at least one verifier participant and at least one certifier participant.

The method comprises generating the proof by the at least one subject participant, where the proof is assigning an authenticity of the at least one certifier participant providing the ESG credential, and the ESG credential is received by the at least one subject participant from the at least one certifier participant, where a public key of the at least one certifier participant is derivable by the at least one verifier participant from the proof via a decentralized registry and used by the at least one verifier participant to verify the authenticity, where the proof is further assigning an integrity of the ESG data or parts of the ESG data or an attribute of the ESG data, and where the public key of the at least one certifier participant is used by the verifier participant to verify the integrity.

The disclosed method is preferably executed in an ecosystem as described above. A system comprising several subject participants, at least one certifier participant and at least one verifier participant, is preferably configured to perform the method in accordance with at least one of the above-described embodiments or in the following. In an advantageous manner, the method enables exchanging ESG information about a product related entity between subject and verifier participants of the system. The usage of the ESG credential from the certifier participant enables a trustworthy certificate about ESG related data without need of a central trusted authority or certificate authority.

The proof generated by the at least one subject participant is, for example, sent to the at least one verifier participant. Sending the generated proof is, for example, triggered by an invitation message sent from the verifier component to the subject component. In alternative embodiments, the subject participant provides the proof triggered by a product offering.

In accordance with an embodiment, the ESG credential is generated by the at least one certifier participant. The ESG credential for example comprises ESG data that the subject participant requesting the ESG credential contributes to a specific product or service. The ESG credential assigns the integrity of the ESG data and the authenticity of the certifier. The ESG credential, for example, is forwarded as proof to the verifier participant by the subject participant in the form and to the extent it has been received from the certifier participant.

In accordance with an embodiment, for generating the ESG credential, the at least one certifier participant verifies at least one further proof of a further subject participant relevant for the ESG data of the product related entity and generates a recursive ESG credential. By including a further proof in the process of issuing an ESG credential, the certifier participant builds a chain of trust. Besides the ESG data of the subject participant requesting the ESG credential, also information about ESG data of further subject participants, in particular all subject participants of same tiers or from different tiers, is included in the ESG credential issued by the certifier. Therefore, information about ESG data of the subject participant as well as information about ESG data of further subject participants is verified by the certifier participant. The proof generated by the subject participant is derived from the recursive ESG credential. For example, the recursive ESG credential is forwarded as proof to the verifier participant by the subject participant in the form and to the extent it has been received from the certifier participant. With the public key of the certifier participant, the verifier participant can again verify the authenticity of the certifier and the integrity of the ESG data. ESG data in this case comprises ESG data of the subject participant as well as further ESG data of the further subject participant.

In accordance with another embodiment, the recursive ESG credential comprises a local ESG section for ESG data of the subject participant and an external ESG section for ESG data of the further subject participant. It is therefore transparent for a verifier, who contributed to an overall ESG information about a product or service to what extent. Due to applying crypto mechanisms when issuing the recursive credential, the transparent information about ESG data is also trustworthy.

In accordance with an embodiment, the at least one subject participant requests the ESG credential from the at least one certifier participant via sending a request message. The request message is, for example, sent to the certifier as soon as an invitation message is received from the verifier participant to provide a proof. The request message preferably includes the ESG data to be certified. Preferably also data contributing to an overall ESG information of the subject's product or service due to sourced products, components or services by other ecosystem participants is included in the request message, so that the certifier participant can verify further proofs about further ESG information of the further subject participants and can, if successfully verified, include the further proofs into the ESG credential.

In accordance with an embodiment, the at least one certifier participant registers a public address and a corresponding public key in the decentralized registry. The at least one certifier participant for example registers its own public key to allow a future verifier participant to verify the proof. For example, the ESG credential is signed by the certifier with its private key and the subject participant provides the signed ESG credential, supplemented by the subject's signature with its own private key, as proof to the verifier participant.

In a further embodiment, the at least one certifier participant defines a credential definition for the subject participant and registers the credential definition in the decentralized registry. The credential definition describes metadata about the ESG data to be certified, in other words defines the schema of future issued credentials. The credential definition is created by the certifier participant, for example, based on a request for a credential by the subject participant, where the subject participant defines the data or attributes to be certified. It defines e.g. what kind of data is coded, which signature mechanism will be applied etc.

In accordance with an embodiment, a first cryptographic signature mechanism for assigning the integrity is based on a first cryptographic signature generated with a private key of the at least one certifier participant and a first cryptographic verification mechanism is based on verifying the first cryptographic signature with the public key of the at least one certifier participant. A first cryptographic signature mechanism is, for example, chosen by the certifier. This allows a flexibility in integrating certifier participants into the network. The signature mechanism can be chosen according to computing power or available crypto primitives. For example, the first cryptographic signature mechanism is fixed for all certifier participants within the ecosystem. Certifier participant then have to fulfill the given criteria for applying crypto mechanisms.

The signature of the certifier participant, using its private key, for example, allows a verification whether the signed data, the ESG data, has been manipulated or not and whether the alleged sender is the correct sender, i.e., the trusted certifier.

In accordance with an embodiment, a first cryptographic signature mechanism for assigning the integrity is based on a cryptographic group signature generated with a private group key common to a trusted group of certifier participants or based on a cryptographic threshold signature generated by two or more certifier participants of a group of trusted certifier participants and a first cryptographic verification mechanism is based on verifying the first cryptographic signature with a public group key of the trusted group of certifier participants. When using group signatures, the actual certifier can be kept anonymous and the ESG credential is still trustworthy. This can be an advantage in scenarios, where for example, the origin of an ESG credential might reveal information about the country of participants in the supply chain, which could again reveal their identities. When using threshold signature mechanisms, the trustworthiness is guaranteed also for scenarios, where a single certifier participant, for example, has been hacked or otherwise manipulated, because due to the nature of interacting threshold signatures, this will not remain unnoticed.

When using group signatures or a trusted group of participants, the public key can still easily be provided by the registry, so that the verifier reads the public key and can verify the integrity of the proof or the integrity of the ESG credential itself.

In accordance with an embodiment, the first cryptographic signature mechanism is based on a zero-knowledge proof. The usage of zero-knowledge proof mechanisms allows a certifier to issue an ESG credential without necessarily providing the ESG data as such or completely or in detail. For example, only attributes of the ESG data, like "value lower than threshold value" or "not manufactured in specific countries" or similar, are provided. These attributes however are verifiably provided, so that an integrity of the attributes and an authenticity of the certifier are guaranteed.

For generating a zero-knowledge proof, a private key of the certifier is used in a zero-proof-signature mechanism, and for verifying, the corresponding public key is used. For use cases, where the ESG credential is forwarded by the subject participant as the proof, the usage of a zero-knowledge signature mechanism for generating the ESG credential enables to hold back certain detailed information about the ESG data, e.g. details about PCF values, which do not have to be disclosed to the verifier to fulfill the criteria of standards applied.

When using zero-knowledge proof mechanisms to attest certain presented attributes or condition statements about ESG information, such as value larger than, or value smaller than, includes, and/or excludes, the authenticity is, for example, proven by usage of a secret of the subject participant. When a subject requests an ESG credential from an issuer it also include with that request a secret. The certifier also signs that secret. This signed secret is part of the credential that the subject gets from the certifier. When creating a proof out of a credential by the subject, this signed secret is also included. The verifier can verify this secret using the public keys that are on the registry and receives confirmation that the proof is coming from the sender, i.e., the subject participant, and the proof is based on the ESG credential issued by the one who created the credential definition ID. The credential definition ID is created when the certifier registers the credential definition for the subject in the decentralized registry.

In accordance with an embodiment, the at least one subject participant is additionally configured as the at least one certifier participant or a further certifier participant and the credential is generated by the at least one subject participant using a root-of-trust technology. The subject participant is, for example, a certified participant and is controlled by a certifier participant or other trustworthy instance of the ecosystem regularly.

In accordance with an embodiment, the at least one subject participant uses different pseudonyms for different communication messages within the network. Especially for scenarios with a chain of subjects attesting their respective ESG information, for example, in a supply chain of a product with multiple subjects contributing to the product, the privacy and confidentiality is guaranteed within the communication network, if the subject participants act with pseudonyms. A subject participant, such as a supplier, directly communicates with the next tier in the supply chain, a manufacturer, and provides the requested proof. The next tier, e.g., a customer, knows the identity of the manufacturer. The customer does not know the identity of the supplier and it is not intended to lay the identities of the whole supply chain open.

The real identities of ecosystem participants that deliver materials, parts, components or services are not exposed because the participants are represented by unlinkable pseudonyms in the form of public keys that are used only in the context of a communication between two participants and moreover preferably only once. When using pseudonyms, for example, when providing the proof to a verifier and certifier or requesting the ESG credentials from the certifiers, or generating the credential definition ID, the real identity is advantageously kept private. Still, verifying the integrity of the proofs is possible, including verifying the proofs of recursive ESG credentials, in particular as the private/public key pairs are registered in the decentralized registry in a trustworthy manner.

The pseudonymization of the participants can be extended, where the decentralized registry allows a few identified ecosystem participants, for example, regulators, auditors and/or state actors, to map pseudonyms to real identities of participants and artefacts according to defined ecosystem governance regulations.

In accordance with another embodiment, the at least one subject participant derives the proof from the ESG credential by using a second cryptographic signature mechanism and a private key of the at least one subject participant. The subject participant can provide the ESG credential supplemented with the subject's own signature to assign an integrity and authenticity of the proof. In other embodiments, a secure communication between subject and verifier is used which dispenses with the second cryptographic signature mechanism.

In accordance with an embodiment, the second cryptographic signature mechanism is based on a zero-knowledge proof. A zero-knowledge proof mechanism can also advantageously be used by the subject participant. In use cases, where the certifier participant provides ESG credentials that disclose detailed ESG data, the subject participant can decide how much information to provide to the verifier participant. For example, only the information necessary to provide evidence that certain standard requirements are fulfilled, can be provided. The zero-knowledge proof is based on cryptographic key pairs, i.e., the public and the corresponding private key of the subject. The usage of a zero-knowledge signature mechanism by the subject participant assigns integrity of the ESG data provided by the subject participant and the authenticity of the subject participant. Moreover, depending on the data disclosed in the zero-knowledge proof, the authenticity of the certifier and the integrity of the ESG credential on which the ESG data provided is based, is determined by the zero-knowledge proof.

With the disclosed embodiments of the method and system, the transparency of ESG data or attributes of ESG data about companies, production sites, products or services across participants within an ecosystem is improved while confidentiality of data and privacy of participants' identities is preserved.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following different aspects of the present invention are described in more detail with reference to the accompanying drawings, in which.

DETAILED DESCRIPTION OF THE EXEMPLARY EMBODIMENTS

Figure 1:
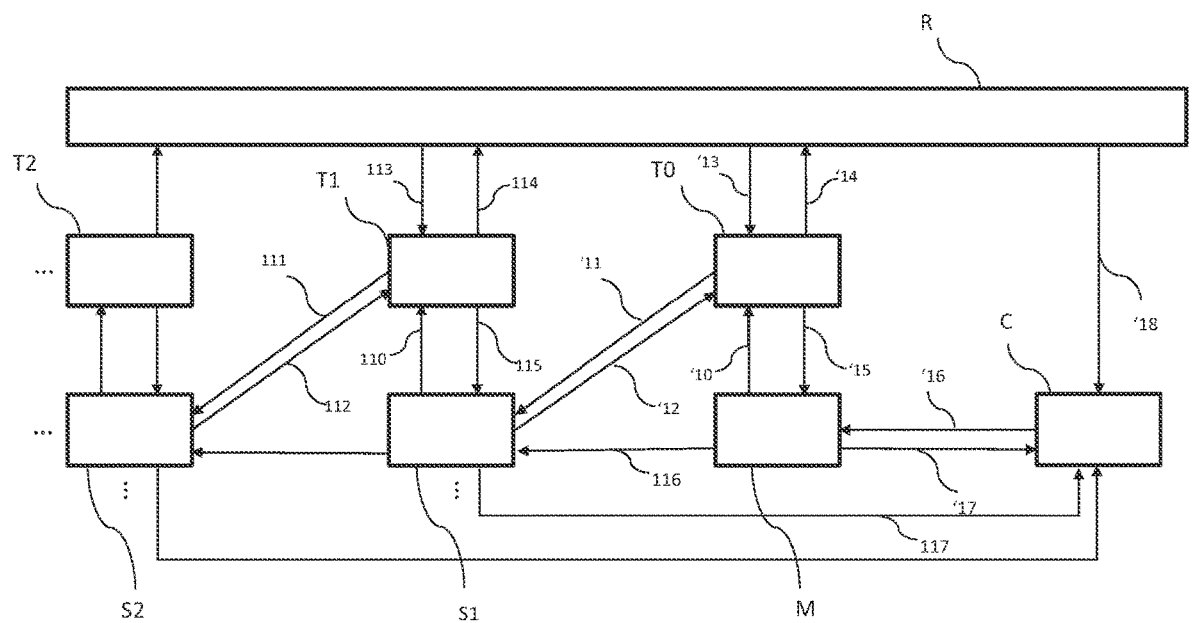
FIG. 1 is a schematic representation of a system exchanging information about ESG data of a product related entity in accordance with a first embodiment of the invention.

FIG. 1 shows a schematic representation of the system in accordance with a first embodiment, where a customer C of a product acts as a verifier participant. The customer C requests '16 ESG information about the product from a manufacturer M, who acts as a subject participant of the system. The ESG information relates to data or statements regarding the impact of the product on an overall score of environmental, social, and corporate governance influence of the concrete product.

In order to be able to provide a verifiable proof with the product's ESG information requested, the manufacturer M requests '10 an ESG credential from a trusted certifier T0 as certifier participant. The trusted certifier T0 registers '14 with an identifier ID and a public key in a decentralized registry R. A blockchain based registry is, for example, used to decentral store public keys of certifiers and to provide them to verifiers like the customer C for later cryptographical verification steps. T0 moreover defines a credential for the manufacturer's M products in the decentralized registry R.

In order to provide the requested ESG credential, the trusted certifier T0 not only has to assign the integrity of ESG data of the manufacturer M, but also from other participants involved in the supply chain of the product. In the first embodiment, by way of example, two suppliers S1, S2 of two different tiers are to be considered for the overall ESG score of the product, as they deliver materials or components. The trusted certifier T0 therefore requests '11 information about the product's components from S1. S1 replies '12 with selected product's components information from a further ESG credential issued by a further trusted certifier T1. S1 provides the selected information embodied in a further proof.

The trusted certifier T0 acts as a verifier participant of the ecosystem regarding the further proof received from the first-tier supplier S1. Based on data in the further proof, such as in particular a credential definition ID, the trusted certifier T0 looks up '13 the credential definition and a public key of the further trusted certifier T1 in the blockchain. The trusted certifier T0 verifies the further proof and issues '15 a signed ESG credential for the product to the manufacturer M. This signed ESG credential is a recursive credential and includes the local ESG data regarding ESG impact of the manufacturer as well as the external ESG data regarding the ESG impact due to the product's components of the first tier supplier S1.

According to the standards agreed to and used within an ecosystem, the ESG credential comprises details to make ESG data from different subjects comparable with each other. Weighting factors might be used in particular to allow the determination of an overall ESG value. The overall ESG value can, for example, be indicated directly. Furthermore, methods or algorithms to determine the overall ESG value can be included in the ESG certificate. Especially for the recursive ESG credential described in the following paragraphs, information about weighting factors or compatibility or conversion is preferably part of the ESG credential.

The manufacturer M derives a proof from the ESG credential received from the trusted certifier T0 and sends '17 it to the customer C. The customer now acts as verifier of the proof and therefore reads '18 a credential definition and a public key of T0. With the information from the blockchain R, the customer C verifies the proof provided by the manufacturer M.

When S1 replies '12 with the selected product's components information from a further ESG credential issued by a further trusted certifier T1, then the following steps have happened in the system of participants of the supply chain: The first-tier supplier S1 requests 110 an ESG credential for the product's components from the further trusted certifier T1. The further trusted certifier T1 registers 114 with its ID and public key in the blockchain R and defines a credential for the product's components of the first-tier supplier S1 in the blockchain R.

Like the trusted certifier T0 is verifier participant for the ESG proof of the first-tier supplier S1, again the further trusted certifier T1 is verifier participant for a second-tier supplier S2. In order to issue an ESG credential for the first-tier-supplier S1, the further trusted certifier T1 has to verify any proof he requests 111 and receives 112 by the second-tier supplier S2. The further trusted certifier T1 reads 113 a credential definition derivable from the proof provided by the second-tier supplier S2 and a public key from the second-tier suppliers trusted certifier T2. The further certifier T1 verifies the proof. The further ESG credential issued by the further trusted certifier T1 is again a recursive credential and advantageously also covers ESG contributions of suppliers in the product's supply chain.

The recursive structure can be continued flexibly, which is indicated with further arrows and participants in FIG. 1.

The participant verifying a provided proof, on the one hand, can cryptographically verify the integrity and authenticity of the proof based on public keys derivable from the blockchain R, as the trusted certifier T0 acted as issuer of the ESG credential, on which the proof is based. Moreover, the verifier can rely on the integrity of any ESG information extractable from the proof, which originates from a further participant of the supply chain as the trusted certifier T0 also acted as verifier regarding proofs derived from further ESG credentials of further subject participants in the supply chain.

In extensions of the embodiment, there is an optional loop implemented to allow a further verification of further ESG credentials or proofs derived therefrom by the customer C. In such an extension, the manufacturer M requests 116 the first-tier-supplier S1 to send the customer C selected product information from the further ESG credential issued by the further trusted certifier T1, i.e. the further proof, directly. The first-tier supplier S1 sends 117 the customer C the further proof and the customer additionally takes over the role to verify the further proof. In these embodiments, appropriate measures have to be in place to protect the confidentiality of the involved participant. The first-tier supplier S1 wants to remain anonymous towards the customer C. For example, measures such as onion-routing-mechanisms or temporary DNS-names are used.

Figure 2:
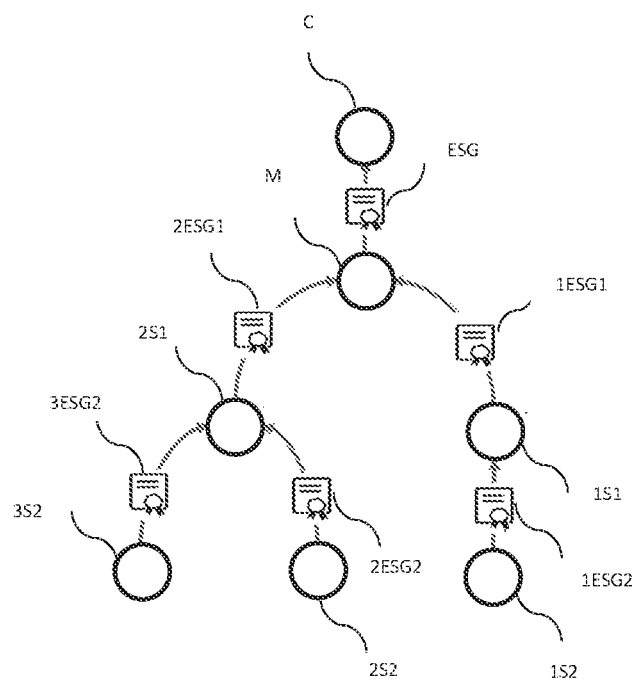
FIG. 2 is a schematic representation of system's participants in a supply chain of a product in accordance with a second embodiment of the invention.

FIG. 2 illustrates the sharing of ESG information in a supply chain in accordance with a second embodiment of the invention. For example, a manufacturer M focusses on ESG-accounting information and provides a proof ESG about ESG data of a product to a customer C. The manufacturer M therefore cooperates with suppliers of an ecosystem sharing ESG information. The manufacturer M collaborates with a first first-tier supplier 1S1 and a second first-tier supplier 2S1, which both provide their respective proofs 1EG1 and 2ESG1. The both first-tier suppliers 1S1 and 2S1 cooperate with second-tier suppliers, in more detail the first first-tier-supplier 1S1 sources material from a first second-tier supplier 1S2, the second first-tier supplier 2S1 sources material and components from a second second-tier supplier 2S2 and a third second-tier supplier 3S2. The second-tier suppliers all provide their respective proofs 1ESG2, 2ESG2, 3ESG2. The reverse tree structure can flexibly expanded to multiple tiers and multiple participants per tier.

As illustrated in FIG. 2, ESG information is be shared within the ecosystem so that the customer C can verify that the product through its life cycle fulfills certain environmental or social requirements/criteria. This could be, for example, that its production does not involve any child or forced labor, that the product does not contain material categorized as conflict mineral or that the total product carbon footprint is below a given value. Such information may be used, besides for customers, for shareholder, regulatory and NGO reporting as well as audits, tax or customs declaration, sourcing simulations and supply chain engineering to gain higher resiliency or lower total product cost.

At the same time, there is in interest of the participants contributing to the overall ESG information, not be forced to openly share all information that would be needed for traditional verification of ESG information within the ecosystem. Information, such as the identity of suppliers and logistics providers, or the countries of sourced material, components and parts, or the serial and batch numbers of components and parts, or the exact carbon off-setting scheme, has to be kept confidential between two direct business partners only. For instance, a buyer of a product must not learn about the actual identity of tier 1, tier 2, tier 3, . . . suppliers of a product.

Figure 3:
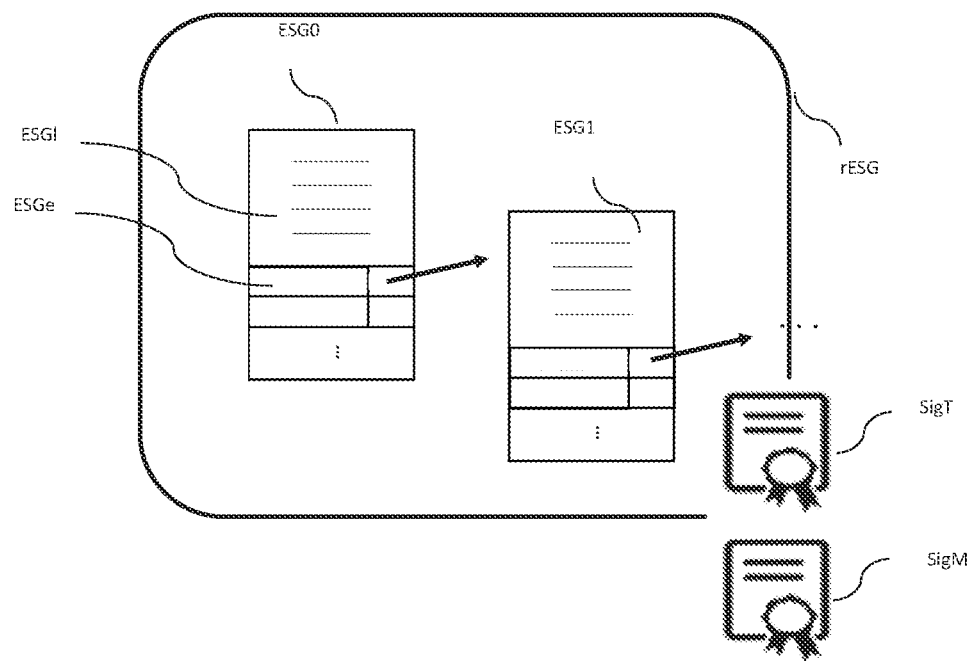
FIG. 3 is a schematic diagram of a recursive ESG credential in accordance with a third embodiment of the invention.

FIG. 3 shows a representation of a recursive ESG credential rESG. The representation comprises an ESG credential ESG0 of a trusted certifier with a local section ESGl, comprising actual Scope 1 and Scope 2 values measured in Kg CO2 according to the GHG Protocol. An external section ESGe comprises external information on all upstream Scope 3 input in the form of pointers to other recursive ESG credentials ESG1 with PCF or CO2 or CO2-e values and information how to calculate the total PCF based on these other ESG credentials ESG1, such as the number of units defined in a bill-of-material.

The recursive ESG credential rESG is supplemented by the signature SigT of a certifier participant T and a signature SigM of a manufacturer M as subject participant. The manufacturer provides the signed recursive ESG credential as proof to a verifier in the ecosystem.

Figure 4:
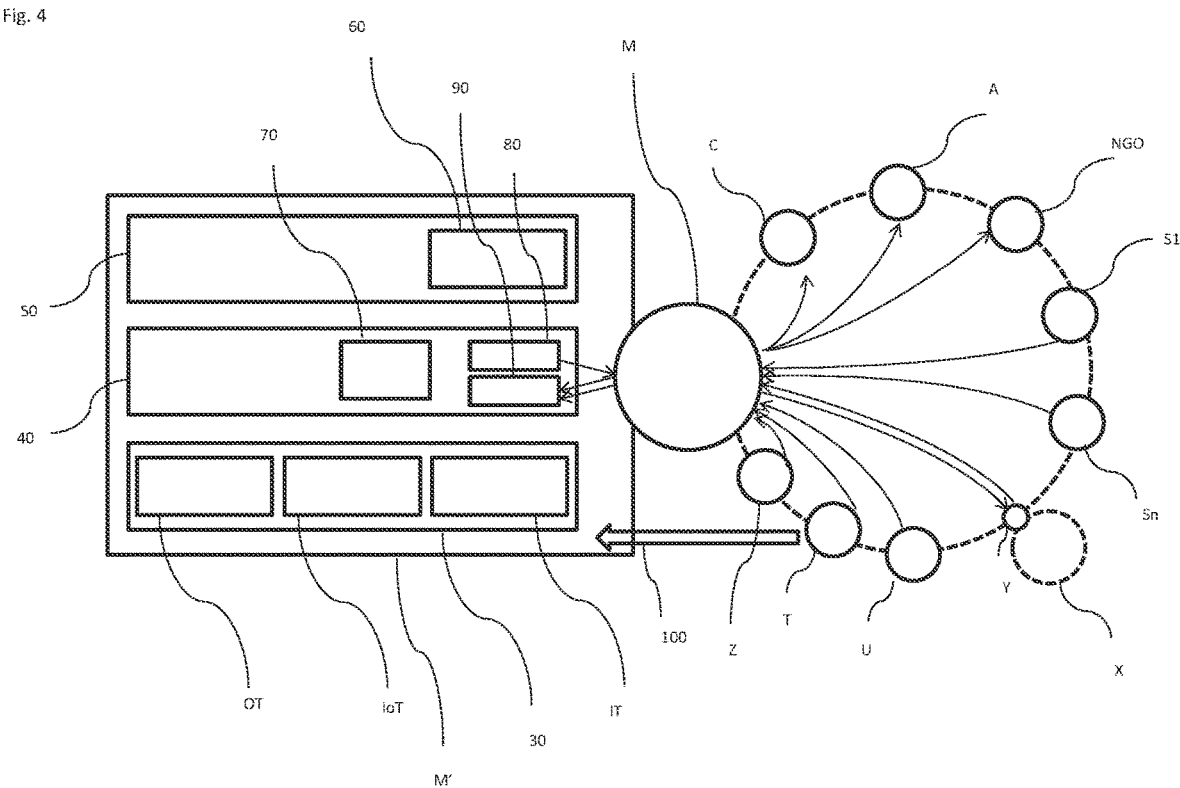
FIG. 4 is a schematic representation of an ecosystem exchanging information about ESG data of a product related entity in accordance with a fourth embodiment of the invention.

FIG. 4 illustrates the interaction of participants in a supply chain ecosystem with a manufacturer M, a customer C, a regulator A, a non-governmental organization NGO, several suppliers S1, Sn, a certifier T, a utility provider U, na adaptor Y to another sharing network X and a representation of a carbon sink Z.

The local ESG information at the manufacturer M is collected from data sources 30 such as the operations technology domain OT, the internet-of-things domain IoT, and the information technology domain IT. In all domains, external inspection 100 by a trusted ecosystem participant, e.g., a certifier T responsible for certifying a plurality of participants, is performed and preferably, in all domains, root-of-trust mechanisms are embedded. In this way, the trust in the local ESG information included in a credential and shared by the manufacturer M is based on (i) tamper-resistant or tamper-proof signing of transactions using root-of-trust technology, (ii) signed certification of the manufacturer, the manufacturer site, the manufacturer processes and/or the production process transactions by a trusted participant T using group or threshold signatures and (iii) signing of manufacturer processes or production process transaction by the manufacturer itself. The latter case is reasonable, when the certification of the manufacturer, the manufacturer site and/or the manufacturer processes is cryptographically verifiable.

Within a computing and data management system M' of the manufacturer M, a data platform 40 is installed to collect 70 local ESG information, to verify ESG credentials received, for example, from suppliers S1, Sn, from the utility provider U, and to generate a recursive ESG credential comprising for example attributes of own ESG data, such as remaining below a threshold GHG value, and attributes of external ESG data, such as again remaining below a different threshold GHG level. The data received from the manufacturer M to generate the ESG credential is received via a communication path within the ecosystem linking direct business partner, for example, via a secure communication protocol. The manufacturer M gets the data, in particular public keys, needed to perform the verification steps, from the decentralized registry, for which all participants at least have read access. The ecosystem is encompassed by a communication system linking the business partners and in addition linking regulatory instances A, NGO at least to key subject participants like manufacturers or OEMs. The ecosystem is further encompassed by a decentralized registry network, e.g., a blockchain network, which is primarily used to manage the identities and pseudonyms of the network participants and their corresponding public keys as well as to guarantee a uniform structure and a workability of the credentials used in the ecosystem.

The computing and data management system M' of the manufacturer M, for example, further comprises an interface 60 for accessing applications like dashboard services 50, for example, to monitor current GHG values for specific products of the manufacturer M.

The arrows demonstrate the paths and directions of sharing ESG information, which preferably is in the form of proofs derived from ESG credentials.

Figure 5:
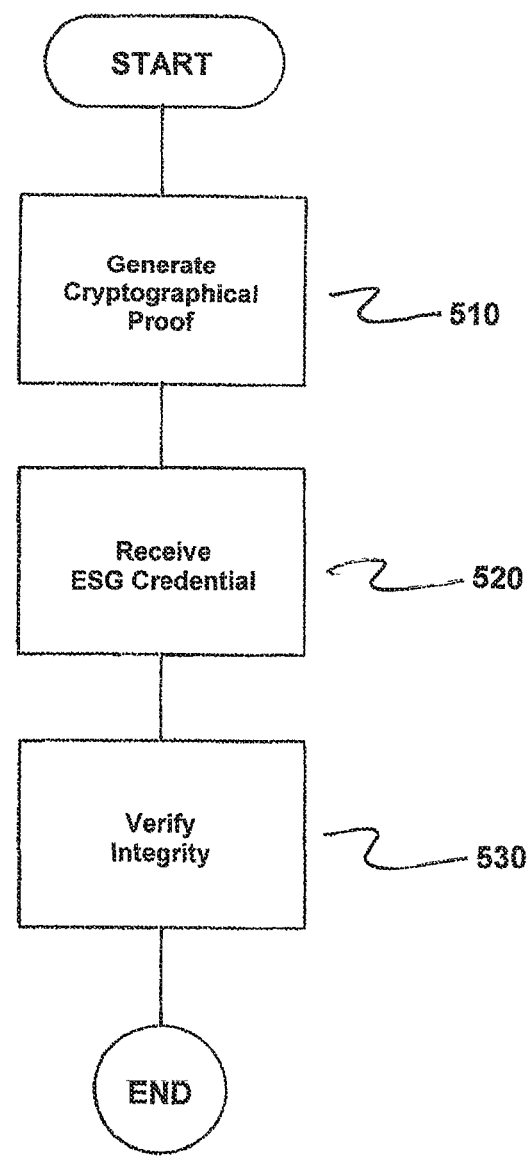
FIG. 5 is a flowchart of the method in accordance with the invention.

FIG. 5 is a flowchart of a computer-implemented method for providing at least one cryptographical proof derived from an environmental, social and governance ESG credential by at least one subject participant M of a communication network exchanging information about ESG data of a product related entity, where the network comprises a plurality of subject participants M, S1, S2, at least one verifier participant C and at least one certifier participant T, T0.

The method comprises generating the at least one cryptographical proof by the at least one subject participant M, as indicated in step 510. In accordance with the invention, the at least one cryptographical proof comprises assigning an authenticity of the at least one certifier participant T, T0 providing the ESG credential.

Next, the ESG credential is received by the at least one subject participant M from the at least one certifier participant T, T0, as indicated in step 520. In accordance with the invention, a public key of the at least one certifier participant T, T0 is derivable by the at least one verifier participant C from the proof via a decentralized registry R and is utilized by the at least one verifier participant C to verify the authenticity, and the proof further comprises assigning an integrity of the ESG data, parts of the ESG data or an attribute of the ESG data.

Next, the public key of the at least one certifier participant T, T0 is utilized by the verifier participant C to verify the integrity, as indicated in step 530.

Although the present invention has been described in accordance with preferred embodiments, it is obvious for the person skilled in the art that modifications are possible in all embodiments.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system comprising:
    subject participants, at least one verifier participant, and at least one certifier participant of a communication network each exchanging information about environmental, social and corporate governance (ESG) data of a product related entity, the information including greenhouse gas emission values, and one of a carbon footprint index, working condition and material origin indicators;
    wherein at least one subject participant of the subject participants is configured to provide at least one proof derived from an ESG credential via the communication network and the at least one of the verifier participant is configured to receive the at least one proof via the communication network;
    wherein the at least one subject participant is configured to receive the ESG credential from the at least one certifier participant;
    wherein the at least one proof is configured to assign an authenticity of the at least one certifier participant providing the ESG credential;
    wherein the at least one proof is further configured to assign an integrity of the ESG data, parts of the ESG data or an attribute of the ESG data;
    wherein the system further comprising nodes of a decentralized registry, the decentralized registry being configured for managing at least one public key of the at least one certifier participant; and
    wherein the decentralized registry provides a public key of the at least one certifier participant corresponding to the at least one proof to the at least one verifier participant to enable the at least one verifier participant to cryptographically verify an authenticity and integrity with the at least one public key via a computing component of the at least one verifier participant.

2. The system according to claim 1, wherein the at least one certifier participant is additionally configured as a further verifier participant of a further subject participant.

3. The system according to claim 1, wherein the at least one subject participant is additionally configured as the at least one certifier participant or a further certifier participant.

4. The system according to claim 2, wherein the at least one subject participant is additionally configured as the at least one certifier participant or a further certifier participant.

5. The system according to claim 1, wherein the at least one certifier participant is configured to have read and write access to the decentralized registry via the nodes; and wherein the at least one verifier participant is configured to have at least read access via the nodes.

6. A computer-implemented method for providing at least one cryptographical proof derived from an environmental, social and corporate governance (ESG) credential by at least one subject participant of a communication network exchanging information about ESG data of a product related entity, the network comprising a plurality of subject participants, at least one verifier participant and at least one certifier participant, the method comprising:
    generating the at least one cryptographical proof by the at least one subject participant, the at least one cryptographical proof comprising assigning an authenticity of the at least one certifier participant providing the ESG credential, the ESG credential including greenhouse gas emission values, and one of a carbon footprint index, working condition and material origin indicators;
    receiving the ESG credential by the at least one subject participant from the at least one certifier participant, a public key of the at least one certifier participant being derivable by the at least one verifier participant from the proof via a decentralized registry and being utilized by the at least one verifier participant to verify the authenticity, and the proof further comprising assigning an integrity of the ESG data, parts of the ESG data or an attribute of the ESG data; and
    utilizing the public key of the at least one certifier participant by the verifier participant to verify the integrity.

7. The method according to claim 6, wherein the ESG credential is generated by the at least one certifier participant.

8. The method according to claim 6, wherein the at least one certifier participant verifies at least one further proof of a further subject participant relevant for the ESG data of the product related entity and generates a recursive ESG credential to generate the ESG credential.

9. The method according to claim 8, wherein the recursive ESG credential comprises a local ESG section for ESG data of the subject participant and an external ESG section for ESG data of the further subject participant.

10. The method according to claim 6, wherein the at least one subject participant sends a request message to request the ESG credential from the at least one certifier participant.

11. The method according to claim 6, wherein the at least one certifier participant registers a public address and a corresponding public key in the decentralized registry.

12. The method according to claim 6, wherein the at least one certifier participant defines a credential definition for the at least one subject participant and registers the credential definition in the decentralized registry.

13. The method according to claim 6, wherein a first cryptographic signature mechanism for assigning the integrity is based on a first cryptographic signature generated with a private key of the at least one certifier participant; and wherein a first cryptographic verification mechanism is based on verifying the first cryptographic signature with the public key of the at least one certifier participant.

14. The method according to claim 6, wherein a first cryptographic signature mechanism for assigning the integrity is based on a cryptographic group signature generated with a private group key common to a trusted group of certifier participants or based on a cryptographic threshold signature generated by two or more certifier participants of a group of trusted certifier participants; and wherein a first cryptographic verification mechanism is based on verifying the first cryptographic signature with a public group key of the trusted group of certifier participants.

15. The method according to claim 14, wherein the first cryptographic signature mechanism is based on a zero-knowledge proof.

16. The method according to claim 6, wherein the at least one subject participant is additionally configured as the at least one certifier participant or a further certifier participant; and wherein the ESG credential is generated by the at least one subject participant utilizing a root-of-trust technology.

17. The method according to claim 6, wherein the at least one subject participant utilizes different pseudonyms for different communication messages within the network.

18. The method according to claim 6, wherein the at least one subject participant derives the proof from the ESG credential by utilizing a second cryptographic signature mechanism and a private key of the at least one subject participant.

19. The method according to claim 18, wherein the second cryptographic signature mechanism is based on a zero-knowledge proof.

\* \* \* \* \*